Sept. 8, 1964     J. K. HARVEY ETAL     3,147,955

APPARATUS FOR DISPERSING FINELY-DIVIDED SOLIDS IN LIQUIDS

Filed Aug. 15, 1960

INVENTORS
PAUL E. BOLIEK
JOHN K. HARVEY

BY *McCarthy*

ATTORNEY

3,147,955
APPARATUS FOR DISPERSING FINELY-DIVIDED SOLIDS IN LIQUIDS
John K. Harvey, Charleston, and Paul E. Beliek, St. Albans, W. Va., assignors to Union Carbide Corporation, a corporation of New York
Filed Aug. 15, 1960, Ser. No. 49,780
2 Claims. (Cl. 259—4)

The invention relates to an apparatus for dispersing finely-divided solids in liquids. In a particular aspect, the invention relates to an apparatus for dispersing finely-divided, water-soluble polymers in water. In a more particular aspect, the invention relates to an apparatus for dispersing finely-divided poly(ethylene oxide) in water.

Water-soluble poly(ethylene oxide) resins of high molecular weight are well known materials commercially produced by the catalytic polymerization of ethylene oxide. As commercially produced, these resins are free-flowing solids having a median particle size which will pass through screens of 10–100 mesh. One of the outstanding properties of these resins is their high thickening efficiency in dilute solutions. In order to utilize the thickening properties of the poly(ethylene oxide) the solid resin must be dissolved. However, solubilizing is difficult since the wetted particles tend to agglomerate and form sticky balls and/or particles that have a slow rate of solution. It is thus important to disperse the resin in a manner which avoids lumping or agglomeration in order that the resin surface to liquid volume ratio not be reduced, which in turn lowers the ratio of mass rate of solution to total mass.

Known methods of dispersion heretofore employed include vigorous agitation for periods of time ranging from 2 to 36 hours or more, blending by use of Venturi nozzles, and the use of dry coating agents such as sodium bicarbonate, sucrose, etc. A further problem arising from the use of dispersion by agitation is the shear degradation of the resin as evidenced by a loss of solution viscosity. In fact, this shear degradation limits the solution viscosity which can be attained when poly(ethylene oxide) is dispersed and dissolved by vigorous agitation.

The present invention provides an apparatus for dispersing finely-divided solids in liquids which is highly useful for preparing a uniform dispersion of poly(ethylene oxide) in water, and thus for facilitating the dissolution of poly(ethylene oxide) in water.

The apparatus of the invention consists of an open-ended, preferably cylindrical, downwardly-extending mixer tube, a plurality of apertures extending through the wall of said mixer tube, said apertures being circumferentially disposed around the wall of said mixer tube, a jacket around said mixer tube which encloses said apertures, conduit means in communication with said jacket for introducing liquid into the space enclosed by said jacket and from there through said apertures into said mixer tube, and means for introducing finely-divided solids into the upper end of said mixer tube.

Figure 1:
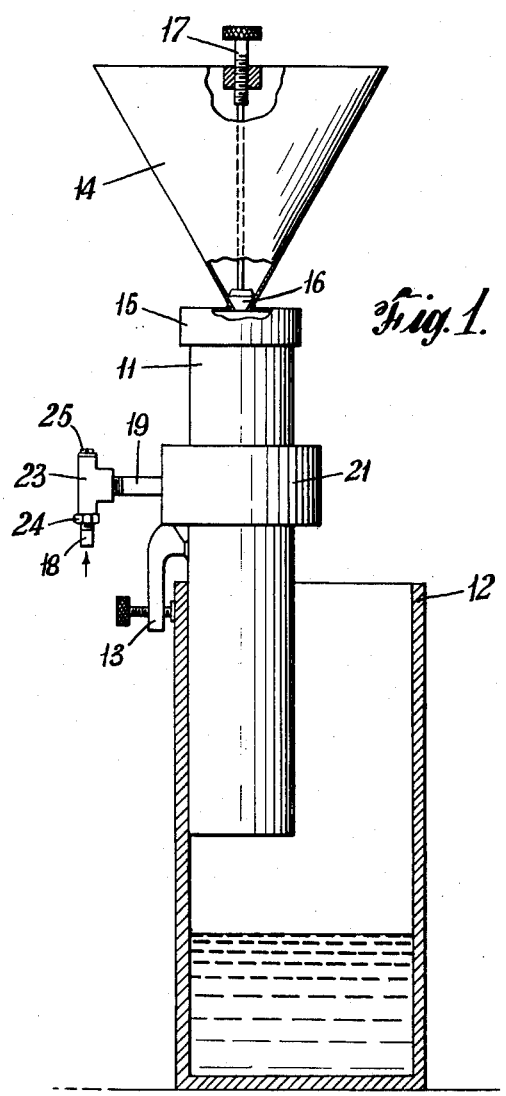
FIGURE 1 is an elevational view of a preferred embodiment of the invention, shown mounted on a container.
Figure 2:
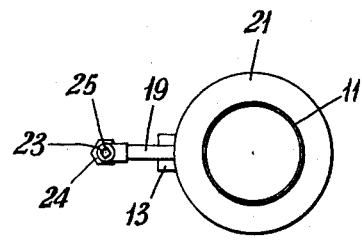
FIGURE 2 is a plan view of the mixer tube.
Figure 3:
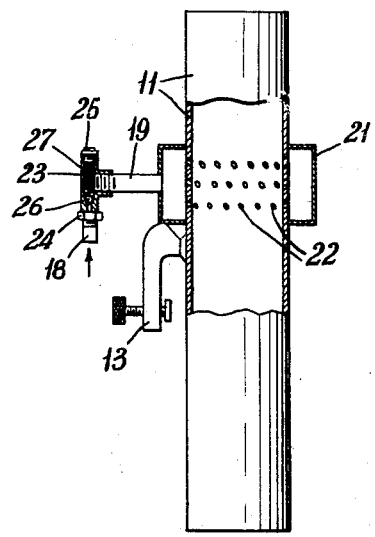
FIGURE 3 is a partial cross-sectional elevation of the mixer tube.

Referring now to FIGURES 1, 2, and 3, wherein like numerals refer to like parts, an apparatus embodying the principles of the invention is shown. In FIGURE 1, an apparatus for dispersing finely-divided solids in liquids is shown mounted on a container. The apparatus comprises a mixer tube 11 which is mounted over the rim of a container 12 by any suitable means, such as a clamp 13. Means for introducing finely-divided solids into the upper end of the mixer tube 11 are shown as a hopper 14 which is attached to the upper end of the mixer tube 11 by a supporting cap 15, which fits snugly over the upper end of the mixer tube 11. The rate of solids feed is regulated by a valve 16 which is controlled by a threaded stem 17.

A source of pressurized liquid (not shown) is attached to the inlet orifice 18 of the conduit means. In FIGURES 1, 2, and 3, the conduit means is illustrated as a tube 19, which is attached to and in communication with a jacket 21 which circumferentially encloses an intermediate portion of the mixer tube 11. As is shown in FIGURE 3, the enclosed portion of the mixer tube 11 contains a plurality of apertures 22 which extend through the wall of the mixer tube 11. The apertures 22 are preferably disposed in a plurality of horizontal rows which extend circumferentially around the mixer tube 11. Preferably, the apertures 22 are slanted downwardly in order to give increased downward velocity to liquid entering through tube 19 into the space enclosed by jacket 21, and then through the apertures 22. The downward slant of the apertures 22 is preferably such that the streams of liquid entering the mixer tube 11 through the apertures 22 all converge in approximately the same horizontal plane; thus the downward slant of the apertures 22 in the top row will be greater than the downward slant of the apertures 22 in the next lower row, and so on down to the bottom row. Some or all of the apertures 22 can be slanted to the right or to the left of a line drawn perpendicularly to the vertical axis of the mixer tube 11, in order to achieve greater turbulence in the converging streams of liquid. In order to maintain sufficient liquid pressure within the space enclosed by the jacket 21, it is necessary that the total cross-sectional areas of the apertures 22 be less than the cross-sectional area of tube 19.

In carrying out the operation of the apparatus, presurized liquid is introduced through inlet orifice 18 into tube 19, then into the space enclosed by jacket 21, and then through the apertures 22 in streams which converge inside the mixer tube 11. The liquid pressure at the source can be from about 5 p.s.i.g., and preferably from about 15 p.s.i.g., to about 100 p.s.i.g. Finely-divided solids, that is, particles having an average particle size in the 10 to 200 mesh range, are introduced and flow downwardly into the mixer tube 11 from hopper 14, the rate of solids feed being regulated by valve 16, and fall into the streams of liquid entering the mixer tube 11 through apertures 22. It is preferred that the liquid entering the mixer tube 11 in streams through the apertures 22 essentially completely cover the cross-section of the mixer tube 11, to prevent fall-through of unwetted solids particles. The finely divided solids are intimately and uniformly dispersed in the liquid when the streams of liquid strike or impinge upon the falling particles. The dispersion is effected before the solids are fully wetted by the liquid, thus avoiding the formation of lumps or agglomerates by wetted, but undispersed, solids particles.

The ratio of solids feed to liquid feed is not critical. While generally a poly(ethylene oxide) solution in water contains from about 0.1 weight percent to about 5 weight percent of poly(ethylene oxide), the apparatus of the invention can process dispersions having a solids content as high as about 30 weight percent. The apparatus can be constructed of any of the common materials, such as aluminum, steel, plastic, copper, glass, and the like.

If desired, the apparatus of the invention can be equipped with vibrating means for promoting even flow of solids into the mixer tube, although the apparatus is fully operative without said vibrating means. Any type of vibrating means can be employed, from an electrically-operated vibrator to a knock on the solids hopper with a wrench. One type of vibrating means which can be employed is a liquid-actuated vibrating means which uses as a source of power the liquid entering the conduit means, and consists of a spherical ball seated against the inside of a circular orifice by a spring, so that liquid entering said orifice will unseat the ball, the spring will reseat the ball, the vibration resulting from the rapid unseating and reseating of the ball.

One embodiment of a liquid-actuated vibrating means is illustrated in FIGURES 1, 2, and 3, and consists of a T 23 which is attached to the liquid inlet end of tube 19, a reducer 24 attached to one arm of the T 23 and a plug 25 attached to the other. A steel ball 26 is seated against the inside opening of the reducer 24 by a spring 27, which in turn is backed up by the plug 25.

The apparatus can be employed to disperse virtually any finely-divided solid in any liquid, but is especially useful for dispersing water-soluble polymers in water, and thereby facilitating the dissolution of said water-soluble polymers in water. In addition to poly(ethylene oxide), other water-soluble polymers which can be dispersed in water by the apparatus of the invention include, for example, hydroxyethyl cellulose, poly(vinyl alcohol), starch, various coagulants, and the like.

The invention is illustrated by the following non-limiting examples:

*Example 1*

An apparatus was constructed in accordance with the invention which had the following dimensions:

Mixer tube—12¾ inches long and 2 inches in diameter, constructed from schedule 40 aluminum pipe.

Apertures—48 circular holes 3/32 inch in diameter. The holes were spaced evenly around the circumference of the mixer tube in three rows. The holes were angled 15° from the perpendicular so as to give a counterclockwise swirl (looking down through the feeder tube) to liquid entering the mixer tube. The holes were also slanted downwardly at an angle of 60° down from the horizontal in the top row, 45° in the second row, and 30° in the bottom row. The top row was 3½ inches from the top of the mixer tube, and the next two rows were spaced at ⅝ inch intervals down the tube (distance was measured to the center of the holes in each row).

Jacket—3½ inches in diameter and 3¼ inches in height. The horizontal center line of the jacket was located 3⅛ inches from the top of the mixer tube.

Conduit Means—A cylindrical tube one inch in diameter, connected to the jacket by a 1-inch IPS aluminum coupling.

Hopper—15 inches in height, 10 inches in diameter at the top tapering to a diameter of ¾ nch at the bottom.

The apparatus described above was employed to prepare 300 pounds of a 1 percent solution of poly(ethylene oxide) in water. The apparatus was attached to a 55-gallon, open-top drum, and three pounds of 60–80 mesh poly(ethylene oxide) where charged to the hopper. A source of pressurized water was attached to the liquid inlet orifice of the conduit means, and then turned on. The water source was under a pressure of about 60 p.s.i.g. After the water was turned on, the feed regulating valve in the hopper assembly was opened, and the solids flow rate was adjusted so that all of the solids were processed through the apparatus in slightly less time than that required for the desired amount of liquid to pass through. The total addition time was about three minutes for the solids and slightly longer for the water. After all of the solids had been dispersed, the contents of the drum were gently agitated by air sparging for 20 minutes, after which time a homogeneous, lump-free solution resulted. The viscosity of the solution (about 6,000 centipoises) indicated that no shear degradation had taken place. Examination of the apparatus disclosed a slight build-up of solids above the liquid injection holes which did not hamper operation.

*Example 2*

The apparatus and procedure employed in Example 1 were used here except that 3,000 pounds of dispersion were processed in about 30 minutes. Examination of the apparatus after the experiment disclosed a considerable build-up of solids above the apertures, which had not hampered operation up to this point, but which indicated that periodic cleaning would be desirable. The solids build-up was readily removed by inverting the mixer tube with the water flow on and flushing the solids out of the tube.

What is claimed is:

1. An apparatus for dispersing finely-divided solids in liquids which comprises an open-ended, downwardly-extending, cylindrical mixer tube; a plurality of apertures through the wall of said tube, said apertures being circumferentially disposed around the wall of said mixer tube in a plurality of rows, each row being in a plane that is substantially perpendicular to the axis of said tube, wherein said apertures are downwardly slanted, wherein all apertures of any one of said rows are slanted downwardly at the same angle, and wherein the apertures of any one row are slanted downwardly at a greater angle from the horizontal than the apertures of the next lower row such that streams of liquid entering said tube through said apertures all converge in substantially the same horizontal plane; a jacket around said tube which encloses said apertures; conduit means in communication with said jacket for introducing liquid into the space enclosed by said jacket and from there through said apertures into said tubes; and means for introducing finely-divided solids into the upper end of said tube.

2. The apparatus of claim 1 wherein each of said apertures is inclined at a slight tangential angle thereby imparting a downward swirl to liquid entering said tube through said apertures.

References Cited in the file of this patent

UNITED STATES PATENTS

| | | |
|---|---|---|
| 1,923,678 | Lowell | Aug. 22, 1933 |
| 1,973,714 | Justheim | Sept. 18, 1934 |
| 2,017,145 | Dunn | Oct. 15, 1935 |
| 2,157,074 | Ericson | May 2, 1939 |
| 2,528,514 | Harvey et al. | Nov. 7, 1950 |
| 2,653,801 | Fontein et al. | Sept. 29, 1953 |
| 2,693,944 | Fowle | Nov. 9, 1954 |
| 2,918,263 | Eichhorn | Dec. 22, 1959 |
| 2,951,061 | Gomory | Aug. 30, 1960 |

FOREIGN PATENTS

| | | |
|---|---|---|
| 685,420 | Great Britain | Jan. 7, 1953 |